United States Patent [19]

Coleman, III

[11] Patent Number: 4,601,994

[45] Date of Patent: Jul. 22, 1986

[54] METHOD FOR PREPARING SUPPORTED $Ti^{III}$ CATALYSTS

[75] Inventor: William M. Coleman, III, Lake Jackson, Tex.

[73] Assignee: The Dow Chemical Company, Midland, Mich.

[21] Appl. No.: 747,208

[22] Filed: Jun. 21, 1985

[51] Int. Cl.$^4$ .............................................. C08F 4/64
[52] U.S. Cl. .................................. 502/111; 502/125; 526/142
[58] Field of Search ................................ 502/111, 125

[56] References Cited

U.S. PATENT DOCUMENTS

| | | | |
|---|---|---|---|
| 3,859,231 | 1/1975 | Kochhar et al. | 502/111 |
| 4,382,019 | 5/1983 | Greco | 502/125 X |
| 4,396,748 | 8/1983 | Shipley | 502/102 X |
| 4,435,519 | 3/1984 | Veazey et al. | 502/111 X |
| 4,452,914 | 6/1984 | Coleman et al. | 502/125 X |

OTHER PUBLICATIONS

"Chelate Compounds of Titanium with Salicyaldehyde and Methyl Salicylate" by A. Yamamoto and S. K. Kambara, *J. Inorg. Nucl. Chem.*, 1961, vol. 21, pp. 58–63.

"Die Einwirkung von Titantetrachlorid auf Sauerstoffhaltige Organische Verbindungen" by A. Rosenhein in *Berichte der Deutschen Chemischen Gesellschaft*, 1915, pp. 447–452, (translation).

*J. Chem. Soc., Chem. Comm.*, 1969, pp. 1064–1065, article by E. C. Alyea et al.

*Polymer*, vol. 24, pp. 121–125, 1983, article by A. D. Caunt et al.

*J. Chem. Soc., Chem. Comm.*, 1980, pp. 214–216, article by A. Chaloyand et al.

*Inorganic Chemistry*, vol. 8, No. 5, pp. 1131–1137, article by W. Giggenbach et al.

Primary Examiner—Patrick P. Garvin
Attorney, Agent, or Firm—J. G. Carter

[57] ABSTRACT

Supported $Ti^{III}$ catalysts are prepared by contacting a slurry of a solid inorganic support such as magnesium chloride in a hydrocarbon medium such as Isopar ® E containing a tetravalent titanium compound containing at least two halogen atoms such as titanium tetrachloride with hydroquinone or a substituted hydroquinone.

12 Claims, No Drawings

METHOD FOR PREPARING SUPPORTED $Ti^{III}$ CATALYSTS

BACKGROUND OF THE INVENTION

The present invention concerns supported $Ti^{III}$ catalysts.

In the polymerization of one or more α-olefins, either $Ti^{III}$ or $Ti^{IV}$ compounds can be employed. It is highly desirable to employ the catalysts on an inert inorganic support. It is also desirable to employ $Ti^{III}$ compounds when relatively lower melt index polymers are desired. However, supported $Ti^{III}$ catalysts are inconvenient to prepare since they are generally insoluble. Therefore, in order to prepare supported $Ti^{III}$ compounds, the solid support and the solid $Ti^{III}$ compound are roll milled so as to prepare the supported $Ti^{III}$ catalyst. The present invention provides a method for preparing supported $Ti^{III}$ catalysts with ease by merely contacting a mixture of the support and a $Ti^{IV}$ compound containing at least two halogen atoms in a hydrocarbon medium with a hydroquinone compound thereby forming the $Ti^{III}$ compound in situ.

SUMMARY OF THE INVENTION

The present invention pertains to a method for preparing supported trivalent titanium compound catalysts which comprises contacting a mixture comprising a solid support material and a tetravalent titanium compound containing at least two halogen atoms attached to the titanium atom in a hydrocarbon medium with a compound represented by the formula

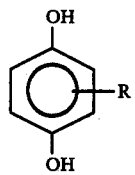

I.

wherein R is hydrogen or an alkyl group having from 1 to about 20 carbon atoms.

Particularly suitable such compounds include, for example, hydroquinone, tert-butylhydroquinone, mixtures thereof and the like.

DETAILED DESCRIPTION OF THE INVENTION

Suitable tetravalent titanium compounds having at least two halogen atoms attached to the titanium atom which can be employed herein include, for example, those represented by the following empirical formulas

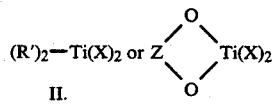

wherein each R' is independently a hydrocarbyloxy group having from 1 to about 20 carbon atoms; each X is a halogen atom and Z is the residue which would remain when the hydrogen atoms are removed from two hydroxyl groups of an aliphatic, cycloaliphatic or aromatic compound containing at least two hydroxyl groups.

Particularly suitable tetravalent titanium compounds include, for example, titanium tetrachloride, titanium tetrabromide, titanium tetraiodide, diisopropoxytitaniumdichloride, diisopropoxytitaniumdibromide, diisopropoxytitaniumdiiodide, mixtures thereof and the like.

The compounds or complexes represented by formula III can be prepared by contacting a titanium compound represented by the formula

TiX$_4$ wherein each X is a halogen, with an aliphatic, cycloaliphatic or aromatic compound containing at least two hydroxyl groups. These titanium compounds wherein aromatic compounds containing at least two hydroxyl groups are disclosed by Coleman, III and Edmondson in U.S. Pat. No. 4,452,914 which is incorporated herein by reference. In a similar manner, aliphatic and cycloaliphatic compounds containing at least two hydroxyl groups can be reacted or complexed with the titanium compound.

Suitable hydroxyl-containing compounds are represented by the following formulas IV-XVIII.

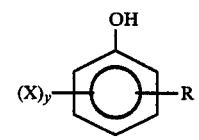

IV.

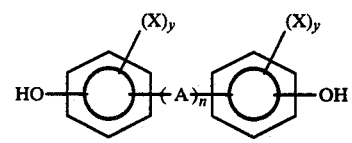

V.

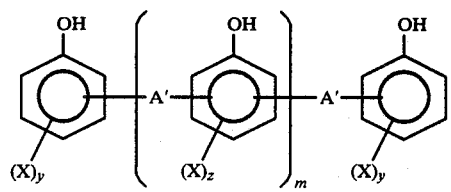

VI.

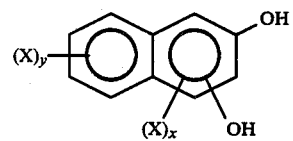

VII.

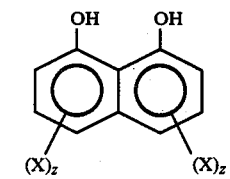

VIII.

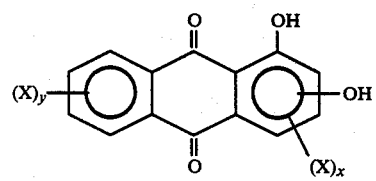

IX.

-continued

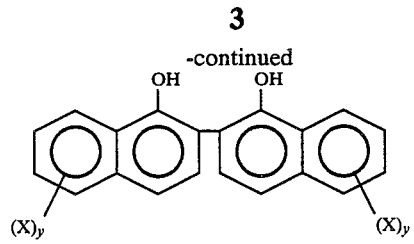 X.

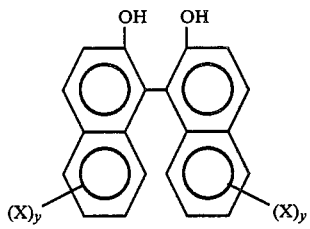 XI.

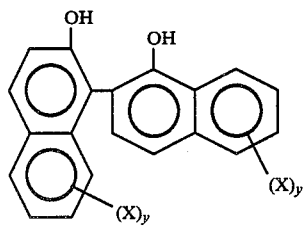 XII.

wherein each A is independently a divalent hydrocarbyl group having from 1 to about 10, preferably from 1 to about 4, carbon atoms, —O—, —S—, —S—S—,

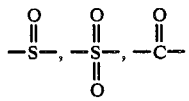

or

each A' is independently a divalent hydrocarbyl group having from 1 to about 10, preferably from about 1 to about 4, carbon atoms; each R is independently —OH,

or a hydroxyl substituted hydrocarbyl or a hydroxyl substituted hydrocarbyloxy group having from 1 to about 20, preferably from 1 to about 10 carbon atoms; each R' is independently hydrogen, hydroxyl or a hydrocarbyl or hydrocarbyloxy group having from 1 to about 10, preferably from 1 to about 6, carbon atoms; each R" is independently hydrogen or a hydrocarbyl group having from 1 to about 10, preferably from 1 to about 6, carbon atoms; each X is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, preferably from 1 to about 12, carbon atoms or a halogen; m has an average value of from about 0.01 to about 6, preferably from about 1 to about 3; eacn n independently has a value of zero or 1; each x independently has a value of from zero to 2; each y independently has a value of from zero to 4; preferably from 1 to 2 and z has a value of from zero to 3, preferably from 1 to 2.

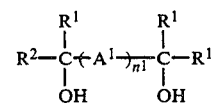 XIII.

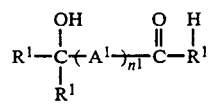 XIV.

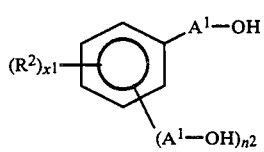 XV.

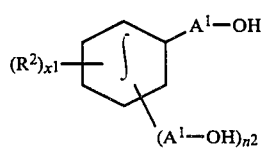 XVI.

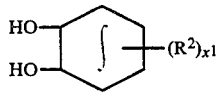 XVII.

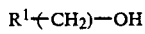 XVIII.

wherein each $A^1$ is independently a divalent hydrocarbyl group having from 1 to about 10, preferably from 1 to about 4, carbon atoms; each $R^1$ is independently hydrogen, a hydrocarbyl group or a halogen, nitro or hydrocarbyloxy substituted hydrocarbyl group, each such hydrocarbyl or hydrocarbyloxy groups having from 1 to about 20, preferably from 1 to about 10 carbon atoms; each $R^2$ is independently hydrogen, a halogen atom, a hydrocarbyl group, a hydrocarbyloxy group or a halogen, nitro or hydrocarbyloxy substituted hydrocarbyl group or a halogen, nitro or hydrocarbyloxy substituted hydrocarbyloxy group, each such hydrocarbyl or hydrocarbyloxy group having from 1 to about 20, preferably from 1 to about 10 carbon atoms; each $n^1$ is independently zero or 1; each $n^2$ has a value of from 1 to 5, preferably from 1 to 2, and each $x^1$ independently has a value of from zero to 4.

Suitable supports which can be employed in the present invention include, for example, the inorganic halides or oxides of magnesium, aluminum, silicon, thorium, zirconium, titanium, combinations thereof and the like.

Particularly suitable inorganic support materials which can be employed herein include, for example, magnesium chloride, magnesium bromide, silica, combinations thereof and the like.

When magnesium halide support is employed, it can be formed in situ by reacting a hydrocarbon soluble compound with a metallic or non-metallic halide source as disclosed by Shipley in U.S. Pat. No. 4,396,748 which is incorporated herein by reference.

Suitable hydrocarbons which can be employed herein include, for example, liquefied ethane, propane, n-butane, isobutane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas and the like, especially when free of any olefin compounds and other impurities, and especially those having boiling points in the range from about −50° C. to about 200° C. Also included as suitable inert diluents are benzene, toluene, ethylbenzene, cumene, decalin and the like.

In the process of the present invention, a mixture comprising the inorganic solid support material and the tetravalent titanium compound in an inert diluent is contacted with hydroquinone or substituted hydroquinone at a temperature of from about 0° C. to about 200° C., preferably from about 10° C. to about 100° C., for a time sufficient to substantially reduce the tetravalent titanium compound to a trivalent titanium compound.

The quantity of hydroquinone or substituted hydroquinone is from about 0.1 to about 10, preferably from about 0.5 to about 5, most preferably from about 0.9 to about 1.1 moles of hydroquinone or substituted hydroquinone per atom of titanium.

The following examples are illustrative of the invention, but are not to be construed as to limiting the scope thereof in any manner.

EXAMPLES

Complexes were prepared by mixing at ambient conditions (~25° C.) an amount of a 0.015 m stock $TiCl_4$ solution is Isopar ® E with the required amount of stock ligand (0.015 m) solution in Isopar ® E to give the desired molar ligand to metal ratio (L/M). The mixture, sometimes colored, was allowed to sit for at least 5 minutes after which time it was added to the catalyst make up in place of the normal titanium source.

PREPARATION OF CATALYST COMPOSITIONS

1. Preparation of Anhydrous $MgCl_2$

To 18.52 ml of 1.06 molar dibutyl magnesium was added 71.48 ml of Isopar ® E. Anhydrous electronic grade HCl was passed through the solution until all of the magnesium alkyl had been converted to magnesium chloride. Excess HCl was stripped from the slurry by purging with dry $N_2$. The resulting slurry (0.2 molar) of $MgCl_2$ in Isopar ® E was stored under a nitrogen atmosphere and utilized as a stock solution in the preparation of catalyst compositions.

2. Catalyst Compositions

The catalyst compositions were prepared by adding with stirring under a nitrogen atmosphere to a 4-ounce (118.3 cc) serum bottle the following components in the indicated order.

Catalyst Preparation A
50−(B+y+z+D+A) ml IPE (Isopar ® E)
  B = ml 0.2M $MgCl_2$
  y = ml 0.15M EADC (ethyl aluminum dichloride)
  z = ml Ti source to give final Ti molarity of 0.0003
  D = ml 0.015M reducing agent of formula I wherein R = t-butyl if employed
  A = ml 0.15M TEA (triethylaluminum)
50 ml total Catalyst Preparation B
  A = 100 ml 0.2M $MgCl_2$
  B = 0.165 ml of neat $TiCl_4$
  C = 0.0015 mole OH containing compound if required
  D = 0.0015 mole ligand of formula I, if employed
  E = 17.7 ml IPE Yields Mg/Ti ratio of 40/3. Components A and B allowed to react for 8 hours prior to addition of Component C. After addition of Component C, reaction allowed to run for 8 hours prior to addition of Component D. After addition of Component D, reaction allowed to proceed for 8 hours prior to addition of Component E.

Catalyst Preparation C
  A = 100 ml 0.2M $MgCl_2$
  B = 0.055 ml of neat $TiCl_4$
  C = 0.0005 mole OH containing compound if required
  D = 0.0005 mole ligand of formula I, R = t-butyl if required
  E = 17.81 ml IPE Yields a Mg/Ti ratio of 40/1. Reaction times identical to those described for Preparation of Catalyst Types A and B.

Catalyst Preparation D
50−(B+A) ml IPE
  B = 3.67 ml of Catalyst Type A
  A = ml 0.15M TEA Catalyst Preparation E
50−(B+A) ml IPE
  B = 3.67 ml of Catalyst Type B
  A = ml 0.15M TEA Catalyst Preparation F
50−(B+A) ml IPE
  B = 3.67 ml Catalyst Type C
  A = ml 0.15M TEA

TABLE

| EX. NUMBER OR COMPARATIVE EXPT. LETTER | CATALYST PREPARATION METHOD | REDUCING AGENT (I) & LIGAND (IV-XVIII) | LIGAND (FORMULAS IV-XVIII)/ METAL RATIO | EFFICIENCY g PE/g Ti | MELT INDEX $I_2$ | MELT FLOW RATIO $I_{10}/I_2$ | DENSITY g/cc | ATOMIC RATIO OF Mg/Al/Cl/Ti |
|---|---|---|---|---|---|---|---|---|
| A | Cat. A, B = 3, y = 0, z = 3, A = 0.6, D = 0 | IV, y = 0, R = 4-t-butyl | 1/1 | 297,000 | 1.97 | 11.35 | .9239 | 40/6/92/3 |
| 1 | Cat. A, B = 3, y = 0, z = 3, A = 0.6, D = 3 | IV, y = 0, R = 4-t-butyl; I, R = t-butyl | 1/1 | 226,000 | 0.23 | 14.8 | .9275 | 40/6/92/3 |
| B | Cat. A, B = 3, y = 0, z = 3, A = 0.3, D = 0 | None | — | 269,000 | 1.26 | 10.2 | .9198 | 40/3/92/3 |
| 2 | Cat. A, B = 3, y = 0, z = 3, A = 1.0, D = 3 | I, R = t-butyl | — | 264,000 | 0.11 | 17.63 | — | 40/10/92/3 |
| C | Cat. A, B = 3, y = 0, z = 3, A = 0.9, D = 0 | XVIII, R = $C_2H_5$ | 1/1 | 390,000 | 0.69 | 11.2 | .9184 | 40/9/92/3 |
| 3 | Cat. A, B = 3, y = 0, z = 3, A = 0.9, D = 3 | XVIII, R = $C_2H_5$; I, R = t-butyl | 1/1 | 207,000 | 0.22 | 20.0 | .9295 | 40/9/92/3 |
| D | Cat. A, B = 3, y = 0, z = 3, A = 0.9, D = 0 | IV, y = 0, R = paraphenyl | 1/1 | 282,000 | 0.94 | 11.9 | .9262 | 40/9/92/3 |

TABLE-continued

| EX. NUMBER OR COMPARATIVE EXPT. LETTER | CATALYST PREPARATION METHOD | REDUCING AGENT (I) & LIGAND (IV-XVIII) | LIGAND (FORMULAS (IV-XVIII)/ METAL RATIO | EFFICIENCY g PE/g Ti | MELT INDEX $I_2$ | MELT FLOW RATIO $I_{10}/I_2$ | DENSITY g/cc | ATOMIC RATIO OF Mg/Al/Cl/Ti |
|---|---|---|---|---|---|---|---|---|
| 4 | Cat. A, B = 3, y = 0, z = 3, A = 0.9, D = 3 | IV, y = 0, R = paraphenyl; I, R = t-butyl | 1/1 | 282,000 | 0.26 | 12.2 | .9269 | 40/9/92/3 |
| E | Cat. E, B = 3.67 A = 0.9, (D = 0) | None | — | 348,000 | 0.78 | 8.69 | .9308 | 40/9/92/3 |
| 5 | Cat. E, B = 3.67 A = 0.9 | I, R = t-butyl | — | 239,000 | 0.36 | 4.56 | .9313 | 40/9/92/3 |
| F | Cat. E, B = 3.67 A = 1.2, (D = 0) | XI, y = 0 | 1/1 | 317,000 | 0.24 | 12.3 | .9243 | 40/12/92/3 |
| 6 | Cat. E, B = 3.67 A = 0.9 | XI, y = 0; I, R = t-butyl | 1/1 | 297,000 | 0.081 | 14.2 | .9257 | 40/9/92/3 |
| G | Cat. F, B = 3.67 A = 1.0, (D = 0) | XI, y = 0 | 1/1 | 1,223,000 | 0.85 | 9.38 | .9224 | 40/10/84/1 |
| 7 | Cat. F, B = 3.67 A = 1.0 | XI, y = 0; I, R = t-butyl | 1/1 | 1,155,000 | 0.53 | 11.04 | .9220 | 40/10/84/1 |
| H | Cat. F, B = 3.67 A = 2.0, (D = 0) | V, N = 0, y = 0, OH's are ortho | 1/1 | 809,000 | 0.87 | 13.76 | .9282 | 40/20/84/1 |
| 8 | Cat. F, B = 3.67 A = 2.0 | V, N = 0, y = 0, OH's are ortho; I, R = t-butyl | 1/1 | 714,000 | 0.34 | 15.2 | .9312 | 40/20/84/1 |
| I | Cat. E, B = 3.67 A = 1.8, (D = 0) | V, N = 1, y = 1, X = p-Cl, OH's are ortho to bridge | 1/1 | 376,000 | 0.83 | 11.4 | .9277 | 40/18/92/3 |
| 9 | Cat. E, B = 3.67 A = 1.8 | V, N = 1, X = p-Cl, OH's are ortho to bridge; I, R = t-butyl | 1/1 | 357,000 | 0.27 | 10.1 | .9289 | 40/18/92/3 |
| J | Cat. F, B = 3.67 A = 1.2, (D = 0) | V, N = 1, y = 1, X = p-Cl, OH's are ortho to bridge | 1/1 | 963,000 | 0.64 | 10.8 | .9242 | 40/12/84/1 |
| 10 | Cat. F, B = 3.67 A = 1.2 | V, N = 1, y = 1, X = p-Cl, OH's are ortho to bridge; I, R = t-butyl | 1/1 | 999,000 | 0.42 | 8.69 | .9245 | 40/12/84/1 |
| K | Cat. E, B = 3.67 A = 1.5, (D = 0) | V, N = 1, y = 1, X = p-t-butyl, OH's are ortho to bridge | 1/1 | 321,000 | 0.53 | 11.7 | .9291 | 40/15/92/3 |
| 11 | Cat. E, B = 3.67 A = 1.5 | V, N = 1, y = 1, X = p-t-butyl, OH's are ortho to bridge; I, R = t-butyl | 1/1 | 334,000 | 0.21 | 11.0 | .9281 | 40/15/92/3 |
| L | Cat. F, B = 3.67 A = 1.5, (D = 0) | V, N = 1, y = 1, X = p-t-butyl, OH's are ortho to bridge | 1/1 | 797,000 | 0.66 | 9.71 | .9247 | 40/15/84/1 |
| 12 | Cat. F, B = 3.67 A = 1.5 | V, N = 1, X = p-t-butyl, OH's are ortho to bridge; I, R = t-butyl | 1/1 | 849,000 | 0.33 | 10.1 | .9216 | 40/15/84/1 |
| M | Cat. E, B = 3.67 A = 1.5, (D = 0) | IV, y = 0, R = $-\overset{\overset{\displaystyle O}{\|}}{C}-H$ | 1/1 | 296,000 | 0.44 | 9.77 | .9246 | 40/15/92/3 |
| 13 | Cat. E, B = 3.67 A = 1.5 | IV, y = 0, R = $-\overset{\overset{\displaystyle O}{\|}}{C}-H$; I, R = t-butyl | 1/1 | 278,000 | 0.077 | 10.56 | .9250 | 40/15/92/3 |
| N | Cat. F, B = 3.67 A = 1.5, (D = 0) | IV, y = 0, R = $-\overset{\overset{\displaystyle O}{\|}}{C}-H$ | 1/1 | 810,000 | 0.83 | 9.95 | .9225 | 40/15/84/1 |
| 14 | Cat. F, B = 3.67 A = 1.5 | IV, y = 0, R = $-\overset{\overset{\displaystyle O}{\|}}{C}-H$ | 1/1 | 696,000 | 0.23 | 10.74 | .9274 | 40/15/84/1 |

TABLE-continued

| EX. NUMBER OR COMPARATIVE EXPT. LETTER | CATALYST PREPARATION METHOD | REDUCING AGENT (I) & LIGAND (IV–XVIII) | LIGAND (FORMULAS IV–XVIII)/ METAL RATIO | EFFICIENCY g PE/g Ti | MELT INDEX $I_2$ | MELT FLOW RATIO $I_{10}/I_2$ | DENSITY g/cc | ATOMIC RATIO OF Mg/Al/Cl/Ti |
|---|---|---|---|---|---|---|---|---|
| O | Cat. E, B = 3.67 A = 1.2, (D = 0) | XIII, R = CH$_3$, R$^2$ = H | 1/1 | 361,000 | 0.60 | 10.1 | .9246 | 40/12/92/3 |
| 15 | Cat. E, B = 3.67 A = 1.2 | XIII, R = CH$_3$, R$^2$ = H, I, R = t-butyl | 1/1 | 313,000 | 0.10 | 13.2 | .9225 | 40/12/92/3 |
| P | Cat. F, B = 3.67 A = 1.2, (D = 0) | XIII, R = CH$_3$, R$^2$ = H | 1/1 | 921,000 | 0.92 | 10.74 | .9232 | 40/12/84/1 |
| 16 | Cat. F, B = 3.67 A = 1.2 | XIII, R$^1$ = CH$_3$; I, R = t-butyl | 1/1 | 856,000 | 0.31 | 11.6 | .9252 | 40/12/84/1 |

I claim:

1. A process for preparing a supported trivalent titanium catalyst which process comprises
   (A) contacting a mixture comprising
   (1) at least one tetravalent titanium compound having at least two halogen atoms attached to a titanium atom; and
   (2) at least one inert solid inorganic support material; in
   (3) at least one inert hydrocarbon diluent; with
   (B) at least one compound represented by the formula

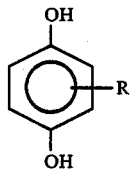

wherein R is hydrogen or a hydrocarbyl group having from 1 to about 20 carbon atoms;
under conditions sufficient to substantially reduce the tetravalent titanium to trivalent titanium.

2. A process of claim 1 wherein
   (i) component (A-1) is titanium tetrahalide or is represented by the formulas

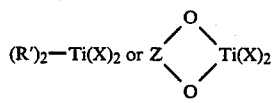

wherein each R' is independently a hydrocarbyloxy group having from 1 to about 20 carbon atoms; each X is a halogen atom and Z is the residue which would remain when the hydrogen atoms are removed from two hydroxyl groups of an aliphatic, cycloaliphatic or aromatic compound containing at least two hydroxyl groups;
   (ii) component (A-2) is the product which results from reacting a hydrocarbon soluble magnesium compound represented by the formula MgR$_2''$·xMR''$_y$ wherein each R'' is independently a hydrocarbyl or hydrocarbyloxy group having from 1 to about 20 carbon atoms; M is aluminum or zinc; x has a value from zero to about 10 and y has a value corresponding to the valence of M; with a halide source represented by the formulas R'X or MR$_{y-a}$X$_a$ wherein M is a metal of Groups IIIA or IVA of Mendeleev's Periodic Table of Elements, R is a monovalent organic radical, R' is hydrogen or an active monovalent organic radical, X is a halogen, y has a value corresponding to the valence of M and a has a value from 1 to 3;
   (iii) component (A-3) has a boiling point of from about −50° C. to about 200° C.; and
   (iv) component (B) is hydroquinone or t-butylhydroquinone.

3. A process of claim 2 wherein
   (i) component (A-1) is titanium tetrachloride, dichlorobis(p-t-butylphenoxy)titanium, dichlorobis(p-phenylphenoxy)titanium, dichloro-o,o'-bisphenol titanium, dichloro-1,1'-Bi-2-naphthol titanium, dichloro-p-t-butyldihydroxyphenylmethane titanium, dichloro-p-chloro-dihydroxyphenylmethane titanium, salicylaldehyde titanium trichloride, trilanediolate titanium dichloride,
   (ii) in component (A-2), the hydrocarbon soluble magnesium compound is n-butyl-2-butylmagnesium, diisopropylmagnesium, n-butyl-ethylmagnesium, butylmagnesium ethoxide, octylmagnesium ethoxide, and the halide source is sec-butylchloride, ethylaluminum sesquichloride, ethylalumindichloride, diethylaluminumchloride, t-butylchloride, hydrogen chloride, benzylchloride, and
   (iii) component (A-3) is liquified ethane, propane, isobutane, n-butane, hexanes, isooctane, cyclohexane, kerosene, benzene, toluene, naphtha.

4. A process of claim 1 wherein said components are contacted at a temperature of from about 0° C. to about 200° C. and component (B) is employed in a quantity of from about 0.1 to about 10 moles per mole of titanium.

5. A process of claim 4 wherein said components are contacted at a temperature of from about 10° C. to about 100° C. and component (B) is employed in a quantity of from about 0.5 to about 5 moles per mole of titanium.

6. A process of claim 5 wherein said components are contacted at a temperature of from about 20° C. to about 50° C. and component (B) is employed in a quantity of from about 0.9 to about 1.1 moles per mole of titanium.

7. A process of claim 2 wherein said components are contacted at a temperature of from about 0° C. to about 200° C. and component (B) is employed in a quantity of from about 0.1 to about 10 moles per mole of titanium.

8. A process of claim 7 wherein wherein said components are contacted at a temperature of from about 10° C. to about 100° C. and component (B) is employed in a quantity of from about 0.5 to about 5 moles per mole of titanium.

9. A process of claim 8 wherein said components are contacted at a temperature of from about 20° C. to about 50° C. and component (B) is employed in a quantity of from about 0.9 to about 1.1 moles per mole of titanium.

10. A process of claim 3 wherein said components are contacted at a temperature of from about 0° C. to about 200° C. and component (B) is employed in a quantity of from about 0.1 to about 10 moles per mole of titanium.

11. A process of claim 10 wherein said components are contacted at a temperature of from about 10° C. to about 100° C. and component (B) is employed in a quantity of from about 0.5 to about 5 moles per mole of titanium.

12. A process of claim 11 wherein said components are contacted at a temperature of from about 20° C. to about 50° C. and component (B) is employed in a quantity of from about 0.9 to about 0.1 moles per mole of titanium.

* * * * *